United States Patent

Park et al.

[11] 3,893,063
[45] July 1, 1975

[54] DETECTION STREAMER

[75] Inventors: Robert H. Park, Pluckemin, N.J.;
Harold W. Klas, Washington, D.C.;
Nelson N. Estes, Austin, Tex.

[73] Assignee: The United States of America as represented by the Secretary of the Navy, Washington, D.C.

[22] Filed: Mar. 15, 1944

[21] Appl. No.: 526,624

[52] U.S. Cl. ............... 340/6 R; 340/3 T; 340/13 R
[51] Int. Cl.² ......................................... G01S 3/80
[58] Field of Search ........... 177/386.1, 386.2, 386.6, 177/386.4, 386.3; 114/235.3, 235.1, 235.2; 340/3 T, 6 R, 7 R, 7 PC, 13 R

[56] References Cited
UNITED STATES PATENTS

| 793,896 | 7/1905 | Mundy | 340/13 |
|---|---|---|---|
| 1,464,103 | 8/1923 | Nash | 340/6 |
| 1,470,733 | 10/1923 | Hayes | 340/6 |
| 1,485,017 | 2/1924 | Cohen | 346/1 |
| 1,490,742 | 4/1924 | Hull | 340/13 |
| 1,584,613 | 5/1926 | Comstock et al. | 340/6 |
| 1,592,019 | 7/1926 | Weber | 114/235 |
| 1,982,045 | 11/1934 | Clithero et al. | 220/85 |
| 2,025,041 | 12/1935 | Colton et al. | 340/8 |
| 2,038,767 | 4/1936 | Spaeth | 220/85 |
| 2,079,620 | 5/1937 | Kunze | 340/6 |
| 2,302,234 | 11/1942 | Marner | 220/85 |
| 2,440,903 | 5/1948 | Massa | 340/10 |

FOREIGN PATENTS OR APPLICATIONS 304,173   2/1929   United Kingdom .............. 416/169

*Primary Examiner*—Richard A. Farley
*Attorney, Agent, or Firm*—R. S. Sciascia; J. A. Cooke

EXEMPLARY CLAIM

1. A torpedo detecting device of the character disclosed comprising, in combination, a plurality of microphone units, means including orientation means for providing each of said units with a vertically arranged substantially dumbbell-shaped response pattern to a sound signal received thereby from a torpedo moving transversely with respect thereto, and coupling means for spacing said units with respect to each other in such a manner as to provide an overlapping of the response patterns of adjacent units and a substantially uniform longitudinal field of response to sound signals received from a torpedo passing any pair of adjacent microphone units at any point therebetween.

7 Claims, 18 Drawing Figures 3,893,063

SHEET 1

Inventors
R. H. PARK
H. W. KLAS
N. N. ESTES

By W. Glenn Jones
Attorney

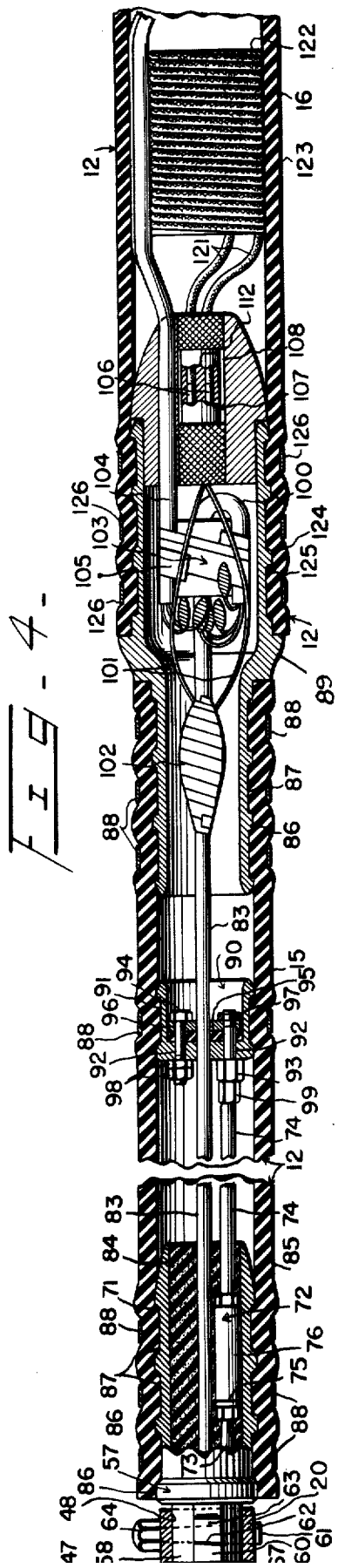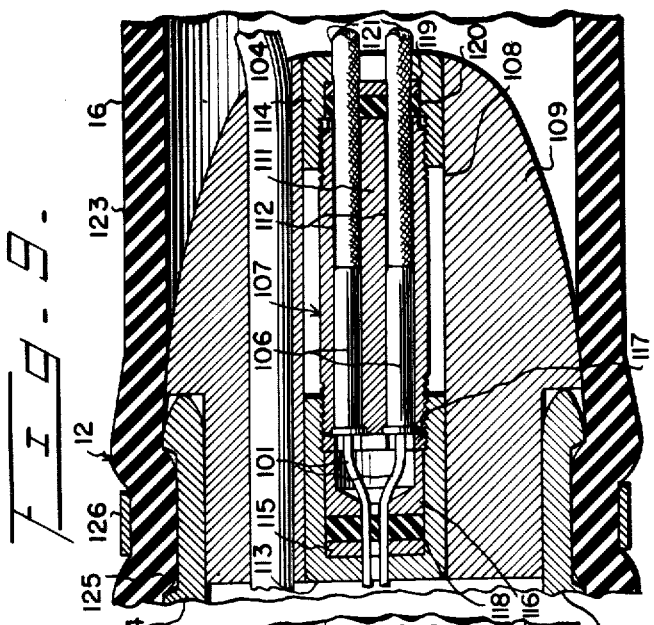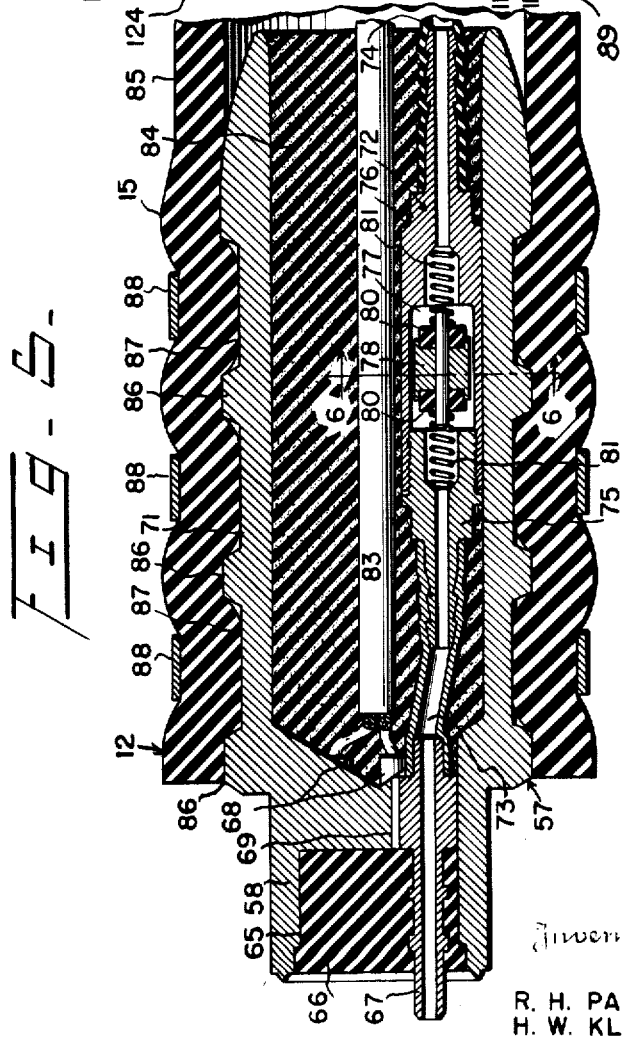

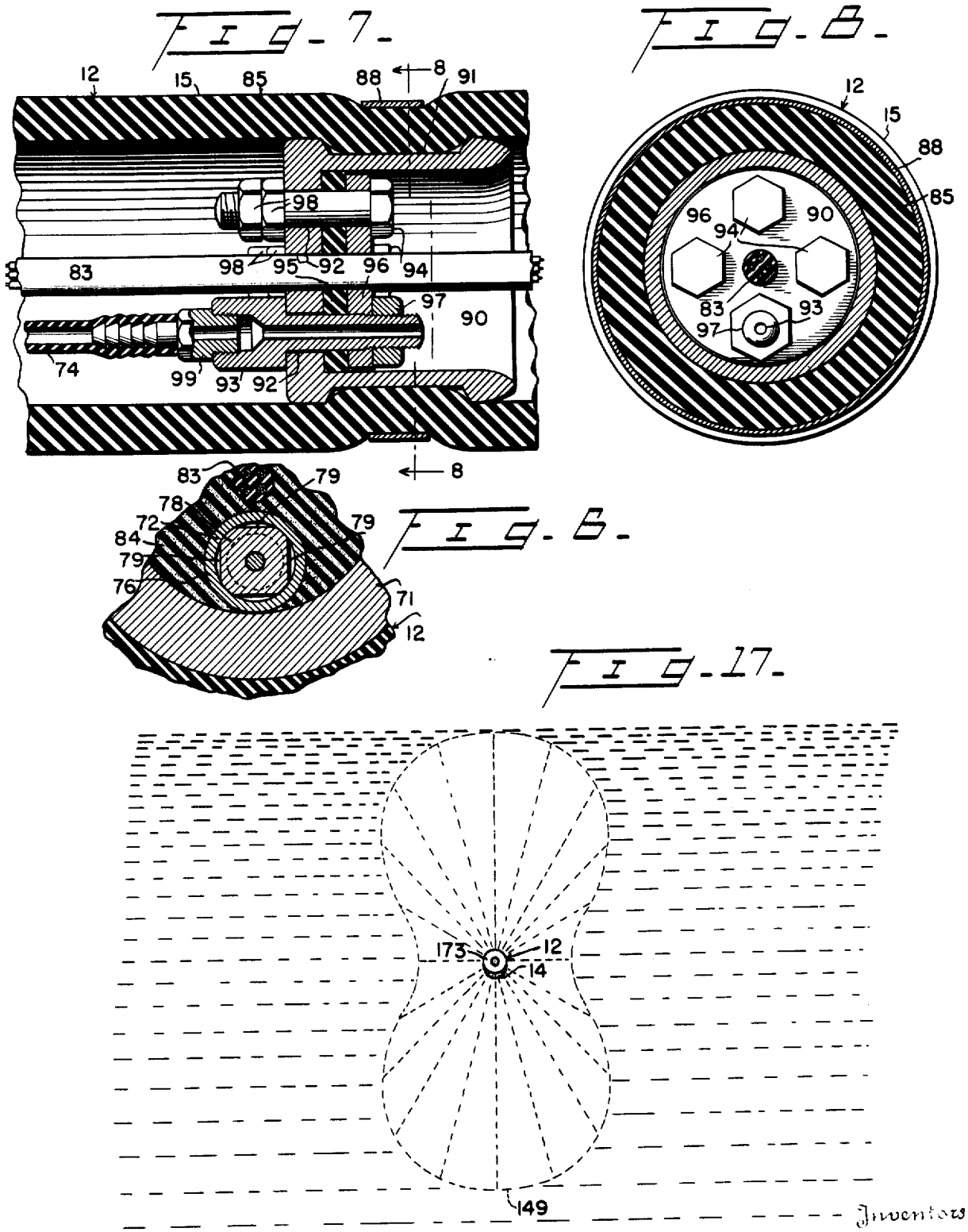

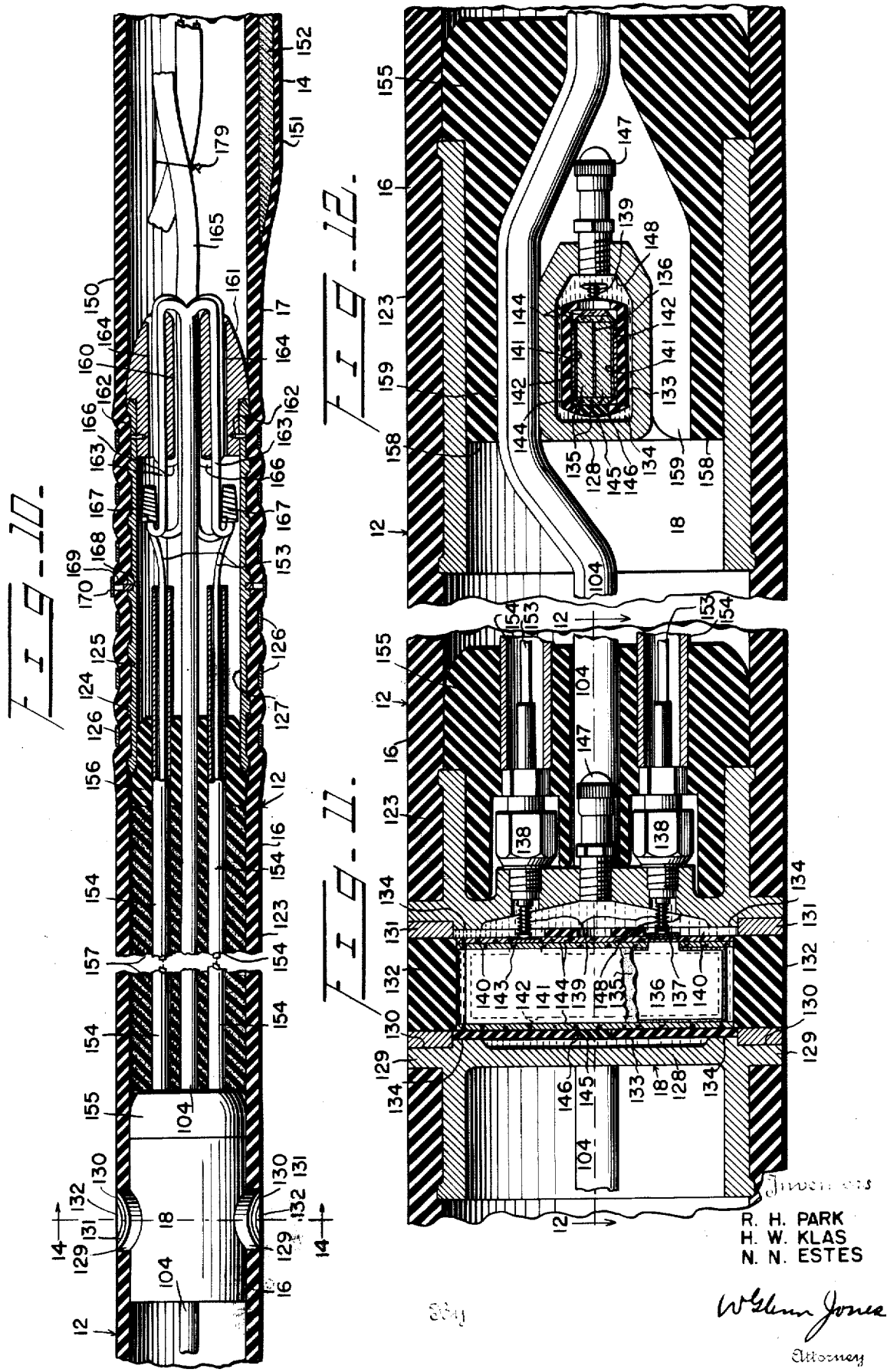

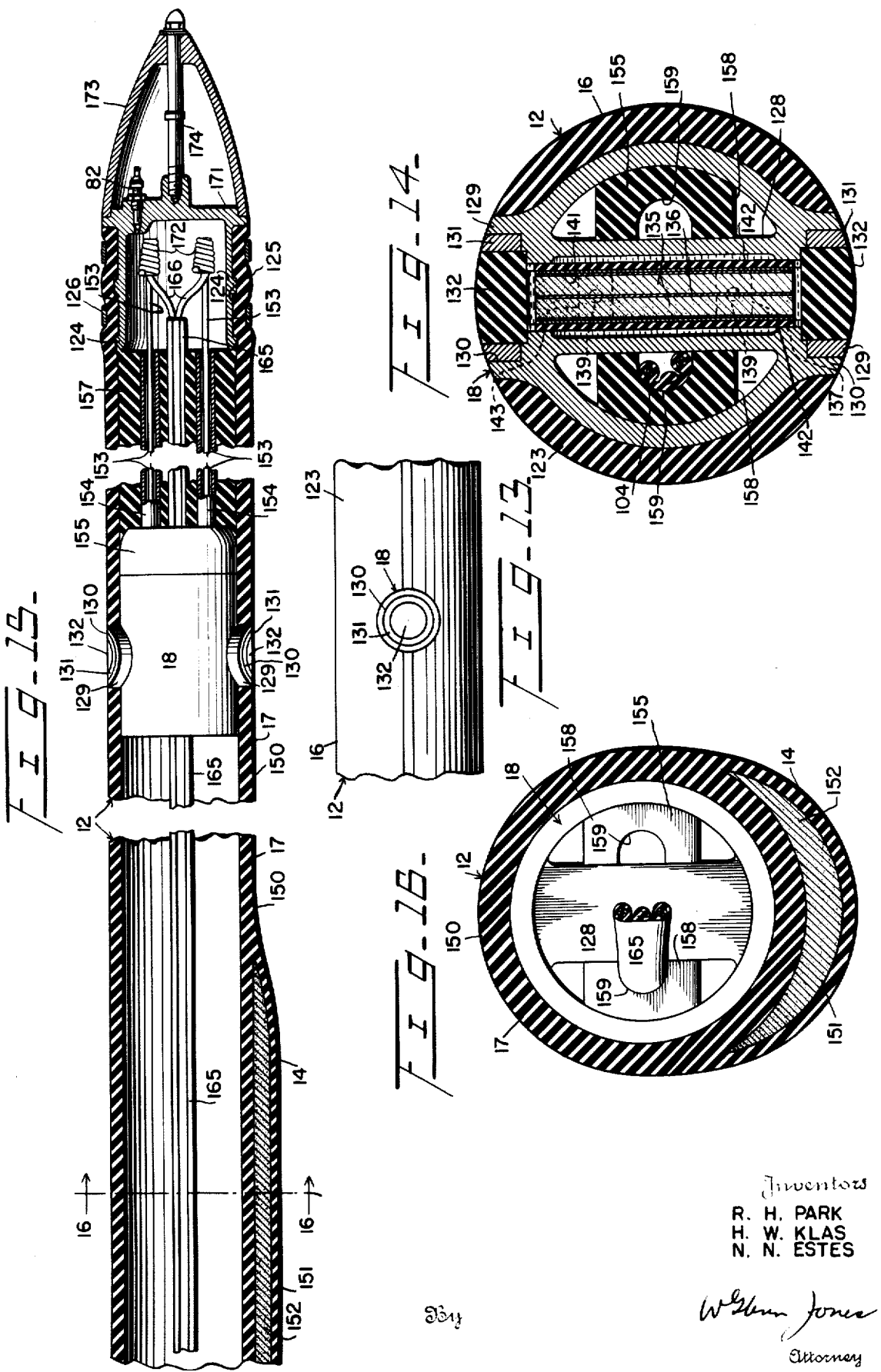

DETECTION STREAMER

This invention relates to detecting devices and more particularly to a new and improved torpedo detection streamer having a plurality of microphonic detecting devices arranged therein in such a manner as to render the detection streamer substantially directionally and uniformly responsive to sound signals received from torpedoes passing above or below the streamer at any point along the length thereof.

The invention is particularly suited for use with the arrangement described and claimed in the copending application of Nelson N. Estes for Anti-Torpedo System, Ser. No. 517,201, filed Jan. 6, 1944 now U.S. Pat. No. 2,979,015, in which a plurality of explosive streamers disposed at different distances beyond a detection streamer within the path of travel of a torpedo is selectively fired in predetermined time delayed relation to the transit or instant of passage of the torpedo with respect to the detection streamer by means of a control mechanism adapted to operate in closely timed relation to the maximum response of the detection streamer to signals received from the torpedo moving with respect thereto, the transit of the torpedo with respect to the detection streamer being substantially synchronized with the maximum response sensitivity of the streamer thereby providing a datum point from which accurately to time the selective firing of the explosive streamers in accordance with the time of travel of the torpedo in moving from the detection streamer into a predetermined position with respect to the explosive streamers.

It has been observed in microphonic devices employed with anti-torpedo systems prior to the system disclosed in the aforesaid application that the changes of received intensity of the torpedo signal, introduced by the azimuthal variations of the sensitivity of the microphonic devices, produce a signal effect in advance of the principal signal effect produced by the torpedo's propellers. This condition is particularly true of a torpedo passing the microphonic devices at a relatively great distance above or below the same. Accordingly, in the prior systems, response of the control mechanism to an advanced signal results in anticipatory firing of the explosive charge, which condition is compensated for by means of an interposed filter giving a time delay, thereby to prevent premature firing of the charge. However, in the case of the prior systems, when the microphonic devices respond to the principal signal, in the case of a torpedo passing relatively near to the microphonic devices, the time delay inherent in the filter and the control mechanism may be sufficient to cause firing of the charge far in arrears of the torpedo thereby only to urge it additionally onward toward its mission od destruction.

The detection streamer of the present invention comprises an elongated hose-like member having a plurality of microphonic devices integrally formed therein and disposed at intervals along the length thereof. Each microphonic device, thus employed, is designed to provide a smooth response pattern which is substantially in the form of a vertical dumbbell of sufficient size to produce an overlapping of the response patterns of adjacent devices thereby to render the detection streamer substantially uniformly responsive to signals received from a torpedo passing above or below the streamer at any point along the length thereof. Furthermore, the vertical dumbbell response patterns, being free of extreme azimuthal variations provide a maximum sensitivity for the microphonic devices in a vertical direction, which direction is substantially maintained throughout the length of the streamer by the addition thereto of suitable material adapted to be influenced by gravity in a manner to produce the desired orientation of the streamer. Moreover, the dumbbell pattern gives the maximum sensitivity in a vertical plane above and below the streamer and causes the signal intensity from the torpedo to increase more rapidly as the torpedo passes through the vertical plane of the detection streamer, thereby substantially reducing variations in the electrical output of the streamer prior to the transit of the torpedo with respect thereto. The construction of the microphonic devices also renders the same responsive to a frequency suitable for the purpose such, for example, as a frequency substantially within the range of 47 to 55 kilocycles per second. This frequency range is well adapted for operation of an acoustically responsive torpedo detection device of the type disclosed herein since the discrimination of the dumbbell pattern of the microphones against ship noise with respect to the transit torpedo noise substantially obviates the danger of spurious response of the device to the noise of the vessel.

Accordingly, by the use of directionally supported microphonic devices of the above described type, a closely defined relation or datum point is established between the transit of a torpedo with respect to the detection streamer and the maximum response sensitivity thereof, the maximum response of the streamer to signals received from the torpedo occurring at the moment that the torpedo's propellers pass the streamer. Such a detection streamer, therefore, is well adapted to initiate the operation of a control mechanism such, for example, as the mechanism employed in the system of the aforesaid application in which the effective operation of the system necessitates a datum point from which predetermined time delays are interposed by the mechanism upon operation thereof.

The detection streamer employs electrical connections and devices for expeditiously connecting the plurality of microphonic devices of the streamer in parallel to the primary winding of a line matching transformer. The transformer is disposed within the streamer and is adapted to match the high impedance of the microphone circuits to the low impedance of a short transmission line to which the secondary winding of the transformer is electrically connected when the streamer is employed in a system such, for example, as the system of the aforesaid application in which the streamers of the system are mechanically coupled to a towing cable which also serves as an electrical and pneumatic supply line for the streamers whereby the streamers are electrically connected to the control mechanism of the system, which mechanism is carried on the towing vessel, and are pneumatically connected to a common supply of compressed air also carried on the towing vessel.

The detection streamer is hermetically sealed and provided with means for receiving a supply of compressed air sufficient to maintain the streamer in a substantially neutrally bouyant condition when the streamer is immersed to a predetermined depth of submergence within the water thereby providing an arrangement in which the collapse of the streamer by the pressure of the water is prevented and the maintenance of the streamer at the predetermined depth of submergence is facilitated as the streamer is towed through the water.

The admission of air under pressure into the streamer is controlled by a flutter value therein near the towed end of the streamer. The flutter valve is adapted to permit the passage of air therethrough into the streamer when the pressure difference between the air within the streamer and the air supply therefor is less than a predetermined amount and is adapted to prevent the passage of air therethrough when the pressure differential exceeds the predetermined amount. Thus, by use of the flutter valve, the air pressure within the streamer may be varied while the streamer is towed within the water. The streamer is also provided at the trailing end thereof with a check valve for rapidly filling the streamer with air prior to launching the same, a streamlined cap being provided for enclosing the check valve thereby to eliminate any tendency of the streamer to whip around and produce supersonic sounds which otherwise might be picked up by the microphonic devices.

The streamer further is provided at the towed end thereof with an explosive means for the purpose of rapidly disconnecting the streamer from the towing means therefor in the event that the streamer has been damaged and is likely to foul the propellers of the towing vessel or when it is deemed necessary to destroy the streamer to prevent it from falling into the hands of an enemy.

A broad object of this invention is to provide new and improved means for detecting the approach of a torpedo.

Another object of the invention is the provision of a new and improved detection streamer in which the maximum response sensitivity of the streamer is closely related to the transit of a torpedo with respect thereto.

Another object of the invention is the provision of a new and improved detection streamer which is substantially directionally and uniformly responsive to torpedoes passing above or below the same at any point along the length thereof.

Another object of the invention is the provision of a new and improved detection streamer having novel means for maintaining a desired orientation thereof.

A further object of the present invention is to provide new and improved means for electrically connecting a plurality of microphonic devices arranged within a streamer of the type disclosed herein pressure disposed at intervals along the length thereof.

A still further object of the present invention is to provide new and improved means for maintaining a streamer of the type disclosed in a predetermined inflated condition by means of air pressure therein and to provide novel valve means for controlling the admission of air under pressure thereto.

An additional object of the invention is the provision in a detection streamer of the type disclosed of new and improved means arranged therein for rapidly disconnecting the streamer from the towing means therefor.

Still other objects of the present invention are those inherent in the novel construction, combination, and arrangement of parts which will become manifest upon examination of the following specification, reference being had to the accompanying drawings wherein:

FIG. 4 is a fragmentary vertical sectional view of the forward portion of the detection streamer taken substantially along the center thereof and showing a portion of the towing cable connected thereto;

FIG. 5 is an enlarged vertical sectional view of the end portion of the streamer shown in FIG. 4;

FIG. 6 is a fragmentary sectional view of the flutter valve taken along the line 6—6 of FIG. 5;

FIG. 7 is an enlarged sectional view of the bulkhead shown in FIG. 4;

FIG. 8 is a sectional view taken along the line 8—8 of FIG. 7;

FIG. 9 is an enlarged vertical sectional view showing the detonator assembly of FIG. 4;

FIG. 10 is fragmentary vertical sectional view of the short streamer section and the standard streamer section attached thereto taken substantially through the center thereof;

FIG. 11 is an enlarged view in section of the microphone unit shown in FIG. 10;

FIG. 12 is a sectional view taken along the line 12—12 of FIG. 11;

FIG. 13 is a plan view of a portion of the detection streamer containing the microphone unit;

FIG. 14 is a sectional view taken along the line 14—14 of FIG. 10;

FIG. 15 is a vertical sectional view partly broken away of the tail portion of the detection streamer taken substantially along the center thereof;

FIG. 16 is a sectional view taken along the line 16—16 of FIG. 15;

FIG. 17 is a diagrammatic view of the vertical dumbbell response pattern of the detection streamer as viewed from the end of the streamer; and, FIG. 18 illustrates in diagrammatic form the electrical circuit of the detection streamer according to the preferred embodiment of the invention.

Figure 1:
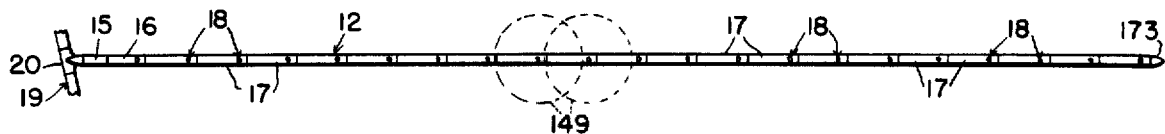
FIG. 1 shows in diagrammatic form a plan view of a detection streamer and the response patterns of the microphonic devices thereof according to a preferred embodiment of the invention.
Figure 2:
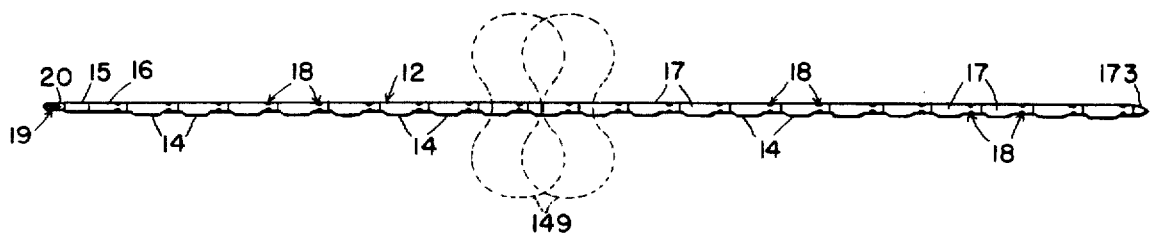
FIG. 2 is a view in elevation of the arrangement shown in FIG. 1.

Referring now to the drawings in which like reference characters are used to designate like or similar parts, and more particularly to FIGS. 1 and 2 thereof, there is shown thereon in diagrammatic form, an elongated flexible tubular or hose-like member indicated generally by the numeral 12 and hereinafter generally referred to as a detection or acoustic streamer. The acoustic streamer comprises a towing head 57, FIG. 3, a buffer section 15, a short intermediate section 16, a plurality of standard sections 17, and a streamlined tail cap 173 coupled end to end to form a single streamer.

The short section 16 and each of the standard sections 17 has integrally molded therein near the trailing end thereof a microphonic device generally designated by the numeral 18 and hereinafter generally referred to as a microphone unit. Each microphone unit is designed to provide a substantially dumbbell-shaped response pattern 149 to a sound signal received from a torpedo passing above or below the microphone unit, the detection streamer, during the operation thereof within a body of water, being maintained therein at a predetermined depth of submergence such, for example, as twenty feet as illustrated in FIG. 17.

The response patterns 149 are of such a size as to produce an overlapping of the patterns of adjacent units sufficient to provide a substantially uniform field of reception to a signal received from a torpedo moving transversely with respect to the detection streamer at any point along the length thereof, and the dumbbell-shaped cross section of the field gives the maximum sensitivity of the streamer to the signal received thereby in a vertical plane above and below the streamer, the maximum response of the streamer occurring at the moment that the torpedo's propellers pass through the vertical plane. Thus, a close relation is established between the maximum response of the detection streamer and the transit or instant of passage of the torpedo with respect thereto.

The maximum sensitivity of the detection streamer is maintained in the vertical direction by means of the eccentric loading 14 on the underside of each of the standard sections 17, and the streamer, except for the buffer section thereof, is adapted to receive air under pressure therein thereby to maintain the streamer substantially neutrally buoyant and to prevent the collapse thereof at the predetermined depth of submergence within the water as will appear in greater detail as the description proceeds.

When the detection streamer 12 is employed in a system for protecting a moving vessel against torpedo attack, the streamer is adapted to be towed through the water by means of a suitable tow cable 19 therefor having a coupling member 20 to which the towing head 57 of the streamer is adapted to be coupled upon launching the streamer within the water, the towing head being provided with connecting devices adapted to engage interfittingly corresponding devices carried by the tow cable thereby to establish electrical and air connections therewith when the towing head is mechanically secured to the tow cable.

The towing cable 19 may be of any type suitable for the purpose such, for example, as the towing cable disclosed in the copending application of Harold W. Klas, for Faired Towing Means For Anti-Torpedo Device, Ser. No. 483,105, filed Apr. 15, 1943, which towing cable is adapted to serve as a pneumatic supply line and a short electrical transmission line for connecting the streamers secured thereto to a source of air under pressure and an electrical control mechanism respectively, the air source and control mechanism being carried on the towing vessel.

Figure 3:
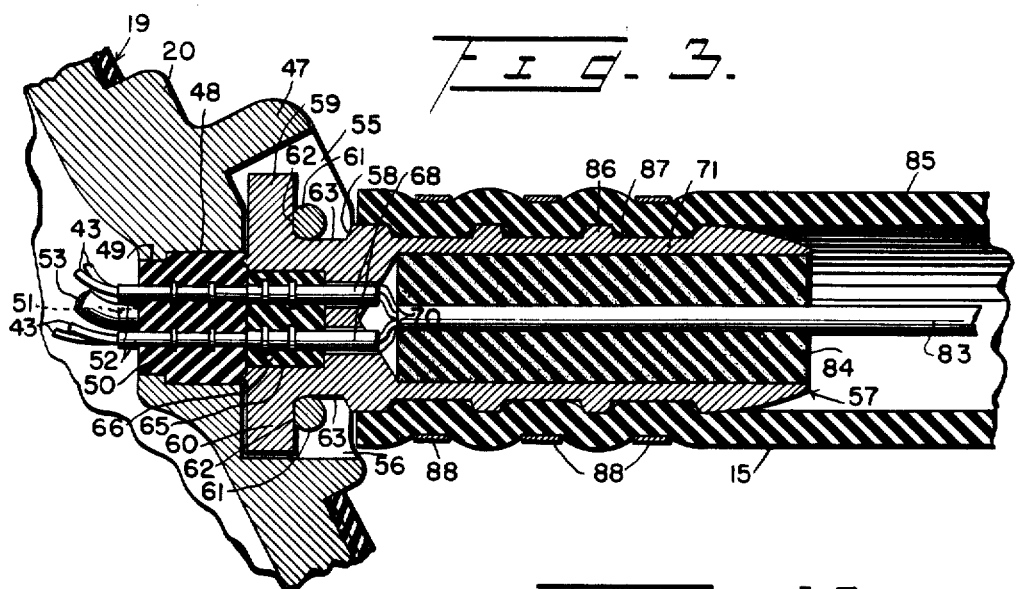
FIG. 3 is an enlarged sectional view of the towing head for the detection streamer shown in FIGS. 1 and 2 and illustrates the manner of attachment thereof to a suitable tow cable therefor.

Referring now to FIGS. 3 and 4, it will be seen that the coupling 20 is provided with a projection 47 which estends in a direction generally parallel to the course of the towing vessel. Extending through the projection 47 is a bore 48, the inner end of which is reduced at 49 to serve as a seat for a plug 50. The plug 50 may be of any suitable material such, for example, as hard rubber having embedded therein an air fitting 51 and a plurality of terminal prongs 52. The fitting 51 is connected to the air line within the towing cable 19 by means of a flexible tube 53 connected therebetween, and each of the terminal prongs 52 is secured as by soldering to one of the plurality of conductors 43 comprising the short transmission line also disposed within the towing cable. The wall of the bore 48 is provided with diametrically arranged slots of grooves 55 and 56 which extend inwardly along the bore to a point slightly beyond the plug 50, the opening provided by the bore and slots being adapted interfittingly to receive the towing head 57.

Referring now to FIGS. 3 thus 5, it will be seen that the towing head has a cylindrical portion 58 and projections 59 and 60 laterally extended therefrom which conform to the bore 48 and grooves 55 and 56 respectively of the coupling 20. The projections 59 and 60 are partially cut away to receive a pair of tapered and threaded pins 61 carried by the coupling 20, the cut surfaces 62 and 63 being inclined to conform to the taper in the pins. Thus, when the towing head is inserted into the opening in the projection 47 of the coupling 20 and the pins 61 are drawn up tight into the position shown on FIG. 4 by means of the nuts 64, the towing head is forced into watertight connection with the plug 50 and secured in locked relation with the coupling 20.

The cylindrical portion 58 is provided with a bore 65 which generally extends in alignment with the bore 48 of the projection 47. Inserted within the bore 65 is a plug 66 which may be of hard rubber, for example, having embedded therein an air fitting 67 and a plurality of terminal prongs 68 adapted to be received interfittingly by the fitting 51 and the plurality of prongs 52 respectively when the towing head is locked to the coupling 20 as shown in FIGS. 3 and 4. The fitting 67 and the terminal prongs 68 respectively extend thru an opening 69 and a plurality of opening 70 in the cylindrical portion 58 into the tubular portion 71 of the towing head in which a flutter valve generally designated by the numeral 72 is located, FIGS. 4 and 6, the fitting 67 having an enlarged portion and offset which conforms to the aperture 69 whereby the fitting is held against rotation therein.

The flutter valve is connected on one end to the fitting 67 by means of a flexible tube 73 and is connected to the other end to a flexible tube 74 which extends outwardly of the towing head. The flutter valve includes a pair of tubular members 75 and 76 which, when screwed together as shown in FIG. 5, provide a chamber 77 in which is located a piston 78. The piston 78 has flattened sides 79, FIG. 6, which permit a limited passage of air between the ends of the chamber, and carries on each end thereof a washer 80 of suitable gasket material adapted to seal the ends of the chamber when the piston moves to bring the sealing washers into engagement therewith. The piston is normally maintained in a position intermediate the ends of the chamber, as shown, by a pair of opposed springs 81 which conveniently may be seated with respect to the piston and the members 75 and 76 in the manner shown. This position of the piston is maintained as long as the difference in pressure in the ends of the chamber does not exceed a predetermined value such, for example, as approximately 8 pounds per square inch. However, when the pressure of the air supplied to the streamer is less than that in the streamer by an amount in excess of the predetermined differential pressure, the piston moves forwardly to seal the chamber thereby to prevent a decrease in pressure in the streamer. When the pressure of the air supplied to the streamer exceeds that in the streamer by an amount in excess of the stated differential such as occurs when the streamer is inflated too rapidly or when the streamer is torn away at some point below the flutter valve thereby releasing the pressure in the streamer, the piston moves rearwardly thereby to seal the chamber and prevent further flow of air therethru. If it is desired to inflate the streamer rapidly, this may be accomplished by forcing air through the conventional check valve 82 which is carried by the tail plug in the end of the streamer, FIG. 15.

The conductors of a cable 83 are secured to the prongs 68 as by soldering, the cable being extended outwardly of the towing head along with the tube 74. The cable 83 and the flutter valve 72 are maintained in fixed position within the towing head by means of a plastic compound 84 which may be of any material suitable for the purpose such, for example, as a plastic compound well known in the art as ozite. The compound, by reason of its sealing qualities, serves as an added protection to prevent the admission of water into the streamers.

Referring now to FIG. 4 and FIGS. 7 thru 16 and in particular to FIG. 4, it will be seen that the buffer section 15 of the acoustic streamer includes a length of hose 85 which may be of any material suitable for the purpose such, for example, as rubber or rubber coated fabric. The forward end of the hose 85 is secured to the towing head 57, the tubular portion thereof having a series of lands 86 and valleys 87 to which the hose is clamped in watertight relation therewith by means of suitable clamping devices 88. The other end of the hose 85 is similarly secured to the small tubular end of a reducer coupling 89.

Disposed within the hose adjacent to the coupling 89 is a cup-shaped bulkhead generally designated by the numeral 90 and having a valley 91 to which the hose 85 is clamped in watertight and airtight relation therewith by means of a clamping device 88. The bulkhead serves to prevent any water which might leak into the buffer section from reaching the other sections of the streamer, and also serves to render the portion of the streamer between the towing head and the bulkhead somewhat more flexible than the rest of the streamer inasmuch as this portion of the streamer is not inflated.

The bulkhead, FIGS. 7 and 8, has a plurality of apertures 92 through which an air fitting 93, the cable 83, and a plurality of bolts 94 are extended. Disposed within the cup of the bulkhead is a packing washer 95 of any suitable gasket material and a metal washer 96 having holes therein in matching relation with the plurality of holes 92 in the bulkhead for accommodating the fitting 93, cable 83 and bolts 94. This arrangement serves as a stuffing box for sealing the bottom of the cup of the bulkhead when the nuts 97 and 98 for the fitting and bolts respectively are tightened sufficiently to compress the packing 95. The fitting 93 includes a coupling member 99 to which the flexible tubing 74 is connected thus completing the air line between the air supply and the streamer.

The cable 83 is bared and a multi-conductor cable 100 and a pair of two conductor cables 101 are spliced hereto, the splice being first covered with a number of layers of rubber tape, not shown, which renders the splice airtight and prevents a splitting of the insulation which might otherwise occur by reason of the air pressure within the streamer. The splice is further covered with a convenient number of layers of friction tape 102 as shown in FIG. 4.

Located within the enlarged end portion of the coupling 89 is a step-down transformer generally designated by the numeral 103. The conductors of the cable 100 are secured as by soldering to the secondary terminals of the transformer and the conductors of a two conductor tape 104, well known in the art as electrotrim wire, are secured as by soldering to the primary terminals of the transformer. The transformer and cables secured thereto are bound as shown with a number of layers of soft paper and tape 105 thereby to cushion the transformer within the coupling.

The cables 101 are connected to a pair of detonators 106, FIG. 9, which are mounted in a detonator holder generally designated by the numeral 107. The detonator holder is inserted into the axial bore 108 of a plug 109 which, in turn, is inserted into the large tubular end portion of the coupling 89. The holder 107 comprises a tubular member 111 having longitudinal bores 112 which contain the detonators 106. The member 111 is threaded on the ends thereof to receive a pair of cup shaped members 113 and 114, the outer surfaces of which are preferably knurled in order to secure the holder 107 within the plug 109. The cup member 113 contains a number of spacing members 115, 116, 117 and a packing washer 118 which serve to lock the detonators within the holder and maintain the cables 101 in fixed position when the member 113 is screwed to the member 111. Similarly the cup member 114 contains a spacing washer 119 and a packing washer 120 which serve to hold the ends 121 of a coil of detonator fuse such, for example, as a fuse well known in the art as primacord, within the bores 112 in abutting relation to the detonators when the cup 114 is screwed onto the member 111. The coil 122, when fired by the detonators 106, is capable of explosive damage sufficient to blow away the streamer in the vicinity of the coil. The buffer section, being deflated, serves to dissipate the force of the explosion thereby preventing damage to the towing cable.

The coil 122 is disposed within a length of hose 123 forming a part of the short acoustic section 16. The hose 123 may be of material similar to that of the hose 85 of the buffer section and is similarly secured to the large tubular end of the reducer coupling 89 which also has a series of lands 124 and valleys 125 to which the hose is clamped in water and airtight relation therewith by means of the clamping devices 126. The other end of the hose 123 is similarly secured to a coupling 127, FIG. 10.

A microphone unit 18 comprising a casting of substantially tubular configuration is integrally molded in the hose 123 at a point relatively near the trailing end thereof. The casting includes a vertical diametrically extending tubular portion 128 substantially of rectangular cross section. In alinement with the portion 128 and exterior of the casting are diametrically opposed flanges 129 which extend to the outer surface of the hose in flushed relation therewith. Each flange 129 has a bore 130 concentric therewith which communicates with the interior of the tubular portion 128. A ring 131 adapted to be received into each bore 130 in pressed relation therewith contains a plug or window 132 of material suitable for the purpose such, for example, as rubber having the same acoustic impedance as sea water. The plugs may be formed in the rings in any convenient manner, preferably by being molded therein.

Located within the chamber provided by the portion 128 and the lugs 132 is a shell 133 which may be molded of any suitable plastic such as bakelite. The shell is snugly held within this chamber by a reduction in the internal cross section of the portion 128 at 134 which conforms to the periphery of the shell. Disposed within the shell is a microphone comprising a pair of salt crystals 135 which preferably are of the type known in the art as Rochelle salt crystals. The crystals are cemented together with an electrode 136 interposed therebetween which may be of metal foil and which serves as the positive electrode of the microphone. A portion of the electrode 136 is brought out into electrical contact with a metallic contact strip 137. The contact strip 137 is yieldably engaged by a terminal 138 carried by the portion 128 of the casting. The terminal has a yieldable contact 139 which extends thru a slot 140 in the shell to contact the strip under pressure.

The sides of the crystals opposite the electrode 136 similarly carry metal foil electrodes 141 which form the negative electrode of the microphone. Two plates 142 of suitable metal are disposed between the electrodes 141 and the shell 133 and are electrically joined by a contact strip 143 of the same material, the contact strip 143 being yieldably engaged by a terminal 138 in the same manner as the terminal strip 137.

The other sides of the crystal assembly are lined with pads 144 of a cork and synthetic rubber composition suitable for the purpose, the thickness of the pads being such as freely to admit the crystal assembly into the shell 133 without producing variations in the transverse static loading of the crystals, as would result should any wedging action occur. The crystal assembly is maintained in a position equi-distant between the windows 132 by means of a button 145 of the same material as the pads 144, the button being inserted through an aperture 146 in the shell 133 into cemented contact with the pad adjacent thereto.

The space between the windows 132 and crystals and between the shell 133 and the portion 128 of the casting provides a chamber into which oil is inserted under pressure. The pressure of the oil is made slightly greater than that of the air in the streamer thereby to prevent air from leaking into the chamber, it being understood that the presence of air in the chamber would also introduce variations in the received sensitivity of the crystals by creating dead spots or areas between the windows and crystals. The oil may be of any type having an acoustic impedance approximately equal to that of sea water such, for example, as castor oil, whereby sound waves which impinge upon the windows 132 produce the same effect as though the waves contacted the ends of the crystals directly.

The oil is admitted into the chamber through a check valve 147 which enters the chamber at a domed shaped surface 148 thereof. In practice, in order to insure that all air has been excluded from the chamber, the chamber is first evacuated to approximately 200 microns and then is filled with oil under pressure, the hose being positioned so that the valve 147 is uppermost thereby to force any air bubbles through the valve. The oil pressure within the chamber causes the windows to bulge and thus provides a means for visually checking the extent of pressure within the chamber.

A microphone unit, of the construction as disclosed above, and fabricated in the manner disclosed, is substantially free of azimuthal variations in the received sensitivity thereof and provides the aforesaid smooth response pattern 149. Since the pattern is substantially in the form of a vertical dumbbell having a maximum sensitivity along a vertical line extending through the axis of the windows 132, the response of the microphone may be considered to be directional. However, the dumbbell form of the pattern is sufficiently non-directional as to provide the aforesaid overlapping of response patterns of adjacent microphones thereby to provide a substantially uniform field of response of reception to signals received by the acoustic streamer. Accordingly, the maximum sensitivity occurs within a vertical plane passing through the axis of the acoustic streamer at any point throughout the length thereof. This plane of maximum sensitivity is utilized as a datum point from which to time the firing of the explosive streamers associated with the detection streamer when the detection streamer is employed, for example, in the system disclosed in the aforesaid application of Nelson N. Estes. For this purpose it is important to maintain the plane of maximum sensitivity perpendicular to the surface of the water as illustrated in FIG. 17.

In order to safeguard the acoustic streamer against a twisting action while being towed through the water which would defeat the above purpose, each hose 150 of each of the standard sections 17 of the acoustic streamer is provided with an outer wall 151, FIGS. 10, 15, and 16, on the underside thereof which houses a mixture of high gravity stock 152 such as a mixture of lead oxide and rubber. This mixture, being inherently flexible, does not impair the flexible character of the streamer. Accordingly, the streamer is capable of being wound on a suitable reel therefor, preferably with the axis of the phone windows perpendicular to the axis of the reel.

It will be understood that the resonant frequency of the microphone units depends upon the length of the crystal, the size and shape of the microphone unit generally, and other physical characteristics thereof.

The terminals 138 are connected as by soldering to a pair of conductors 153, FIGS. 10, 11, and 15. The conductors are protected by a pair of flexible tubes 154 which, together with the conductor tape 104, extend through and are supported by, a pair of rubber plugs 155 and 156 carried by the microphone casting and coupling 127 respectively, and a suitable cushion filler 157, such as sponge rubber, which is disposed within the hose 123 between the plugs. It will be understood that the plug 155 is also conveniently formed to receive the terminals 138 and valve 147 and is provided with portions 158 which project along the sides of the vertical portion 128 of the microphone casting, FIG. 14. The portions 158 have grooves 159 through one of which the conductor tape 104 is passed, as clearly appears in FIG. 14.

The conductor tape 104 extends through the axial bore 160 of a suitable plug 161 which is inserted into the trailing end of the intermediate coupling 127 and secured therein by means of pins 162. The portion of the tape extending beyond the plug is split and the separated conductors 163 thereof are extended one each through a pair of off-set bores 164 in the plug to a point adjacent to the conductors 153. A second conductor tape 165 disposed within the hose 150 is passed through the bore 160, and the conductors 166 thereof are similarly carried back through the bores 164 and forwardly again through the axial bore 160 to a point adjacent to the conductors 153 and 163. The conductors are bared and spliced, the connection being first bound with rubber tape, not shown, and then conveniently bound with friction tape 167 to provide an air tight splice. By means of the above anchoring arrangement it will be readily understood that any strain in the conductor tapes 104 and 165 is taken up by the plug 161 rather than by the splice between the conductors thereof. As a further precaution to prevent strains in the conductors generally throughout the streamers which result from a flexing thereof, the conductors and cables are provided with sufficient slack as appears, for example, in FIG. 10, the slack or looped portion of the cable being secured in any suitable manner as by the cord 179.

By reason of the foregoing arrangement and construction of the electrical connections between the several microphone units and the cushioning supports for the connections, the detection streamer is capable of receiving shocks applied thereto without impairing the effectiveness of the connections, such shocks being caused, for example, by the explosion of the explosive streamers associated with the detection streamer when the streamer is employed, for example, in an anti-torpedo system of the type disclosed in the aforesaid application of Nelson N. Estes.

It will be seen that the hose 150, which may be of the same material as that of the hose 123, is similarly secured to the coupling 127. The coupling has a centrally disposed groove 168 into which a ring 169 is inserted, and the gap between the hoses 123 and 150 is closed by a clamping device 170 to provide a smooth outer surface and thereby prevent the development of supersonic noises as the streamer is towed through the water.

It will be understood that the construction of each standard section 17 of the acoustic streamer, except for the weighted underside thereof and the difference in length, is identical to that of the short section 16 of the streamer. The standard sections are all identical except that the trailing section contains a cup-shaped tail plug, FIG. 15, 171, rather than an intermediate coupling 127, and the conductors 166 of the conductor tape 165 are connected directly to the conductors 153 of the hydrophone by a splice 172 similar to that of 167. The check valve 82 in the end plug 171 is covered by a tapered tail cap 173 which is secured to the tail plug 171 by means of a bolt 174, the tail cap being streamlined thereby to prevent turblence of the water and the development of supersonic noises as the streamer is towed through the water.

From the foregoing it should now be obvious that the orientation of the maximum sensitivity of the microphone patterns within the vertical plane of the detection streamer is determined by the disposition of the crystal assemblies within the respective hose sections, the orientation of the several hose sections with respect to each other and to the towing head of the streamer, and the effectiveness of the eccentric loading in overcoming the inherent tendency of the streamer to twist.

In practice, for example, in order to obtain the desired orientation of the streamer, each standard or ballasted section is eccentrically loaded with an amount of the high gravity ballast 152 sufficient to overcome or balance one half of an estimated inherent tendency of the section to twist, and the section thereafter is floated in water to determine the deviation of the plane of the microphone windows from the true vertical plane of the section. In assembling the streamer, the short or unballasted section 16 and the strandard section 17 connected thereto are oriented so that the microphone windows thereof lie in a plane perpendicular to the plane of the projections on the towing head, and the standard sections are coupled end to end in such a manner as to compensate from section to section for the aforesaid deviations in the sections.

Figure 18:
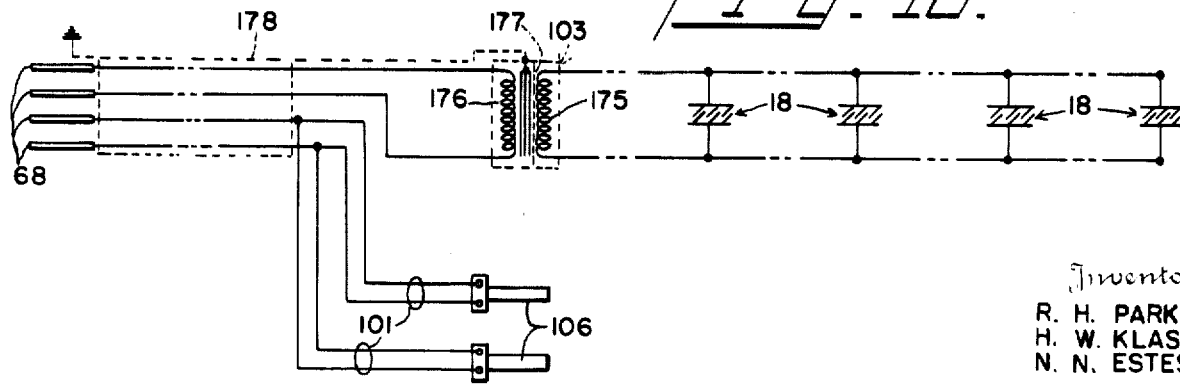

By reason of the aforedescribed electrical connections of the detection streamer, the microphone units 18 thereof are connected in parallel to the primary winding 175 of transformer 103 and the secondary winding 176 of the transformer is connected to a pair of terminal prongs 68, the other pair of prongs being connected to the detonators 106 as illustrated diagrammatically in FIG. 18. Thus, the microphone units and the detonators are adapted to be electrically coupled to a suitable control mechanism therefor by way of the short transmission line 43 within the towing cable 19 when the streamer is mechanically coupled thereto, the transformer 103 being adapted to match the high impedance of the microphone circuits to the low impedance of the transmission line. The transformer preferably is provided with an electrostatic shield 177 which may be connected to the metallic sheath of the transmission line, which sheath may be grounded to the coupling 20, for example, and the connection completed by means of a metallic sheath 178 on the cable connections between the terminal prongs 68 and the transformer, the sheath 178 being grounded to the transformer and to the towing head 57, for example.

From the foregoing, it should now be apparent that a detection streamer has been provided which is well adapted to fulfill the aforesaid objects of the invention. Moreover, it will be further obvious that although the invention has been described in particularity with respect to the detection of torpedoes moving transversely thereto, it will be understood that use of the invention need not be so limited, but also may be employed advantageously in the detection of other automotive devices adapted to be operated on land, sea, or in the air.

While the invention has been described with reference to but a single embodiment thereof which gives satisfactory results, it will be obvious to those skilled in the art to which the invention appertains, after understanding the invention, that the same is susceptable of additional embodiments, modifications, and variations thereof without departing from the spirit and scope of the invention as defined by the appended claims.

The invention herein described and claimed may be manufactured and used by or for the Government of the United States of America for governmental purposes without payment of any royalties thereon or therefor.

What is claimed as new and desired to be secured by Letters Patent of the United States is:

1. A torpedo detecting device of the character disclosed comprising, in combination, a plurality of microphone units, means including orientation means for providing each of said units with a vertically arranged substantially dumbbell-shaped response pattern to a sound signal received thereby from a torpedo moving transversely with respect thereto, and coupling means for spacing said units with respect to each other in such a manner as to provide an overlapping of the response patterns of adjacent units and a substantially uniform longitudinal field of response to sound signals received from a torpedo passing any pair of adjacent microphone units at any point therebetween.

2. A torpedo detecting device of the character disclosed comprising, in combination, an elongated member having a plurality of flexible sections coupled end to end, a plurality of microphone units in each of said sections respectively, and means including orientation means for providing each of said units with a vertically arranged longitudinally continuous substantially dumbbell-shaped response pattern to a sound signal received thereby from a torpedo moving transversely with respect thereto.

3. In a torpedo detecting device of the class disclosed, the combination of a flexible member comprising a plurality of coupling members and a plurality of hose-like sections joined by said coupling members, a plurality of castings respectively molded within each of said sections at one end portion thereof, each of said castings having a chamber arranged diametrically therein, a pair of flexible windows respectively mounted in watertight relation in the end portions of said chamber and substantially flush with the exterior surface of the associated hose-like section, and a microphone mounted within each said chamber and acoustically coupled to said windows and responsive to sound signals impinging on said windows in a manner to provide a dumbbell-shaped response pattern.

4. In a detecting device of the character of claim 3, the addition in combination of a relatively heavy mass of flexible material distributed along one side of each of said sections thereby to orient and maintain the microphones with the direction of maximum sensitivity thereof substantially vertical.

5. In a torpedo detecting device of the class disclosed, the combination of a flexible member comprising a plurality of watertight coupling members and a plurality of substantially airtight hose-like sections joined by said coupling members, a plurality of castings respectively molded within each of said sections at one end portion thereof, each of said castings having an airtight chamber arranged diametrically therein, a pair of flexible windows respectively mounted in watertight. relation in the end portions of said chamber, a microphone within said chamber in spaced relation with respect to said windows, and a fluid under pressure within said chamber between the microphone and said windows whereby sound signals conforming to a dumbbell-shaped response pattern and impinging on said windows are transmitted to said microphone.

6. In a torpedo detecting device adapted to be towed within a body of water by a surface vessel, the combination of an elongated hose-like streamer, a towing device secured to one end of said streamer and having unitary means for establishing electric, pneumatic, and towing connections between said vessel and the streamer, means including a plurality of electroacoustic torpedo detecting devices disposed within the streamer at predetermined spaced intervals along the length thereof and adapted to generate signals for transmission to the vessel through said electric connections, electroresponsive explosive means in correlation with signal reception by said detecting devices and disposed within the streamer for disconnecting the streamer from said towing device when the explosive means is fired by energy transmitted thereto from the vessel through said electric connections, and orientation means for maintaining a predetermined positional relationship for the streamer with respect to the detecting devices whereby the response pattern thereof is synchronized with transverse torpedo travel thereover including an air valve disposed within the towing device and responsive to the pressure of the air supplied to the streamer from the vessel through said pneumatic connection for maintaining a predetermined pressure differential between the pressure of the air within the streamer and the pressure of the air supplied thereto whereby the streamer is rendered substantially neutrally buoyant at a predetermined depth of submergence as the streamer is towed through the water and release of the pressure of the air supplied to the towing device is prevented when the streamer is disconnected therefrom.

7. In a torpedo detecting device adapted to be towed through the water by a surface vessel, the combination of a plurality of hose-like sections including a buffer section, means coupling said sections end to end to form a single streamer with said buffer section arranged at the leading end thereof, means for hermetically sealing said streamer exclusively of said buffer section, a towing device secured to the buffer section and having unitary means for establishing electric, pneumatic, and towing connections between the streamer and the vessel, means including a plurality of microphones having predetermined uniform field response characteristics arranged respectively within the rections comprising the hermetically sealed portion of the streamer and adapted to generate signals for transmission to said vessel through said electric connections, means associated with the streamer for maintaining the direction of maximum response sensitivity of said microphones substantially in alignment with the vertical plane of the streamer, means for disconnnecting the streamer from said towing device comprising a coil of explosive fuze and electroresponsive detonating means therefor arranged within the hermetically sealed portion of the streamer and adapted to be fired by energy supplied to the detonating means from the vessel through said electric connections in correlation with a predetermined signal pickup by said microphones within the field thereof, and means including an air valve disposed within the towing device for supplying to the hermetically sealed portion of the streamer air received thereby under pressure from the vessel through said pneumatic connection and adapted to maintain a predetermined pressure differential between the pressure of the air within the hermetically sealed portion of the streamer and the pressure of the air supplied to the towing device thereby to render the streamer substantially neutrally buoyant at a predetermined depth of submergence as the streamer is towed through the water to thus maintain constant the microphone response field and to prevent release of the pressure of the air supplied to the towing device when the streamer is disconnected therefrom.

* * * * *